July 2, 1968 — E. NEGRI — 3,390,518
AUTOMATIC CONTROL DEVICE

Filed Jan. 12, 1966 — 2 Sheets-Sheet 1

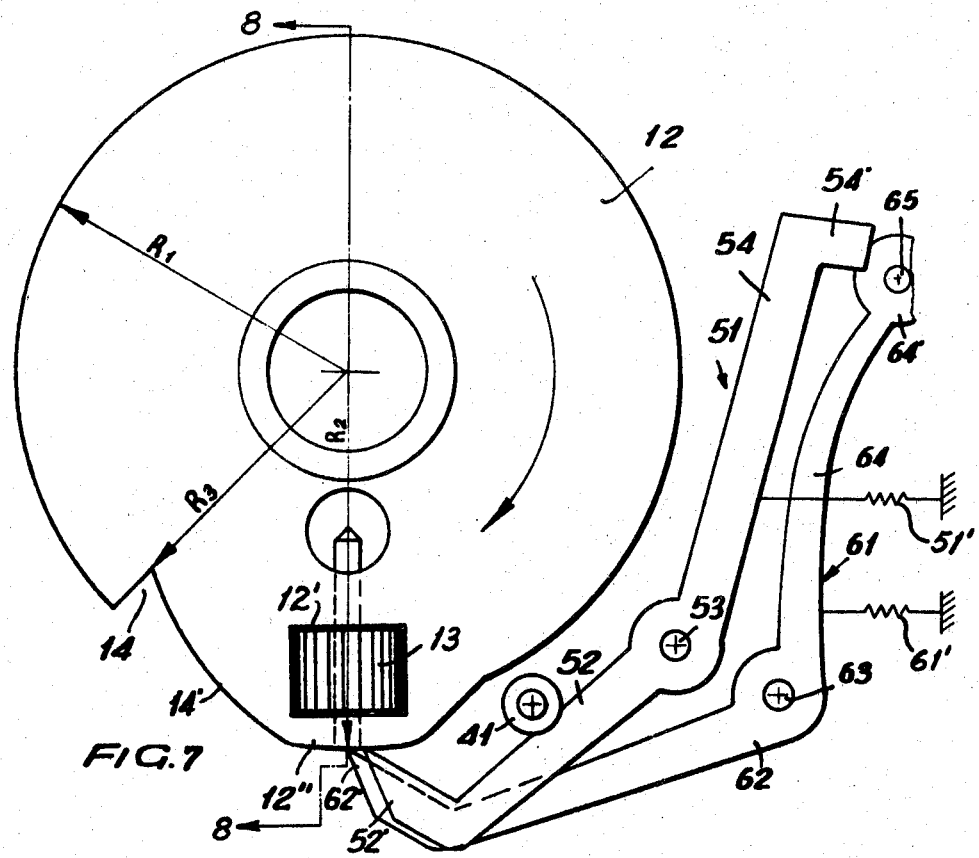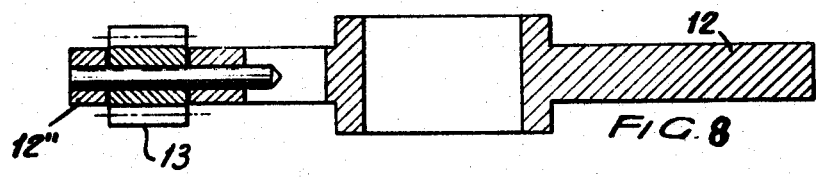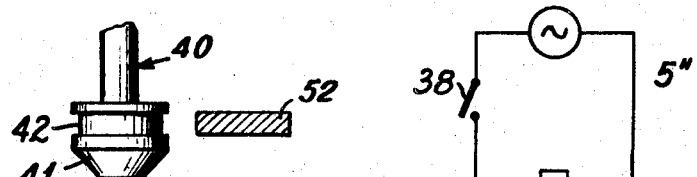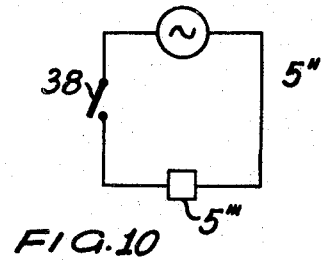

United States Patent Office 3,390,518
Patented July 2, 1968

3,390,518
AUTOMATIC CONTROL DEVICE
Emilio Negri, Via Vanvitelli 41, Milan, Italy
Filed Jan. 12, 1966, Ser. No. 520,291
Claims priority, application Italy, Jan. 13, 1965, 748,688;
Apr. 7, 1965, 802,176
13 Claims. (Cl. 58—9)

ABSTRACT OF THE DISCLOSURE

A control device adapted to give a command of a predetermined duration which is repeatable at pre-established intervals, the command having utility in controlling operation of another device which may be associated with the control device, which includes a rotatably supported cam having a notch on the peripheral surface thereof, movable means normally biased into sliding surface engagement with the peripheral surface of the cam and adapted to move into the notch once during each rotational cycle of the cam to produce a command, a manually operated blocking assembly which is settable to effect withdrawal of the movable means from the notch to interrupt the command, the cam being adapted to automatically reset the blocking mechanism to permit a command to be produced during a succeeding rotational cycle of the cam.

---

There are already known clockworks using an alternating current with a synchronous motor in which every 12 or 24 hours there is a contact operating an acoustic signal. Once this contact breaks automatically after a pre-established length of time, it is known that on the striking of the 12th or 24th hour the contact will automatically start up again.

However, in this type of clockworks, if the contact is interrupted by an outside control, it is necessary to have a further control, opposite to the original one, in order to ensure that at the next 12th or 24th hour the contact will be automatically re-established.

Thus, if by way of example, it is assumed that a known clock in which the contact is established every 12 or 24 hours, has been set to give an alarm at 8 a.m. and that this contact having been set was then interrupted by an external control, such as by pushing a button, it will be necessary to operate another control, as by pushing another button, in order to reset the alarm for 8 a.m.

It is evident that it is not practical to have to reset the alarm each evening in order for it to ring the following morning.

Accordingly, a general object of the present invention is to provide a control device capable of producing a command for a pre-established length of time, which repeats itself in a cyclic manner with predetermined frequency in spite of interruption of the command by an external control; the command having utility for the periodic and cyclic operation of either electrical or mechanical devices associated with the control device.

A more specific object of the present invention is to provide a control device, particularly adapted for use with electric alarm clocks, which establishes a contact at a pre-established time, i.e., every 24 hours, interrupts it automatically after a certain predetermined period of time, and then automatically re-establishes it, even if the contact has been broken by an external control.

In a first embodiment of the present invention there is provided a control device comprising a speed reducer having as a rotating element thereof, a cam provided with a notch on its peripheral surface; a lever or ratchet member adapted to engage the cam and be rotated periodically or cyclically by the presence of the notch to produce a command; and a blocking assembly adapted to engage the member during the period of time fixed for the command so as to cause the member to be rotated in a direction to interrupt the command, the cam at the end of the period of command assuming a position which effects rotation of the member in the same direction but to a greater extent than the member rotation due to the blocking assembly, whereby permitting disengagement of the blocking assembly from the member and the return thereof to a rest position so as to permit a command to be produced during a subsequent cycle of operation of the device.

In a second embodiment of the present invention, the cam is formed of an insulated material and has on its peripheral surface adjacent the notch, a protruding area, and the lever or ratchet member is replaced by a pair of adjacently disposed lever arms. The arms are provided with first end portions which are pointed and are adapted to engage the peripheral surface of the cam at closely spaced points, and second end portions which are provided with electrical contacts, the closing and opening of which produces a command which is controlled by the notch of the cam. The blocking assembly, which is adapted to engage one of the levers for the purpose of preventing or interrupting closing of the contacts and therefore the producing of the command, is automatically disengaged from the lever after the period for the command by cooperation between the protruding area of the cam and the lever.

The nature and operation of the present invention will become apparent from the following description taken with the accompanying drawings in which:

FIGURE 7 shows the plan of improved device according to the second embodiment.

FIGURE 8 shows a section of the cam in FIGURE 7 drawn along the line 8—8 of FIGURE 7.

FIGURE 9 is a fragmentary view illustrating structural details of the blocking assembly shown in FIGURE 7; and FIGURE 10 is a diagrammatic view of an electric alarm circuit adapted to be operated by the device of the present invention.

Figure 1:
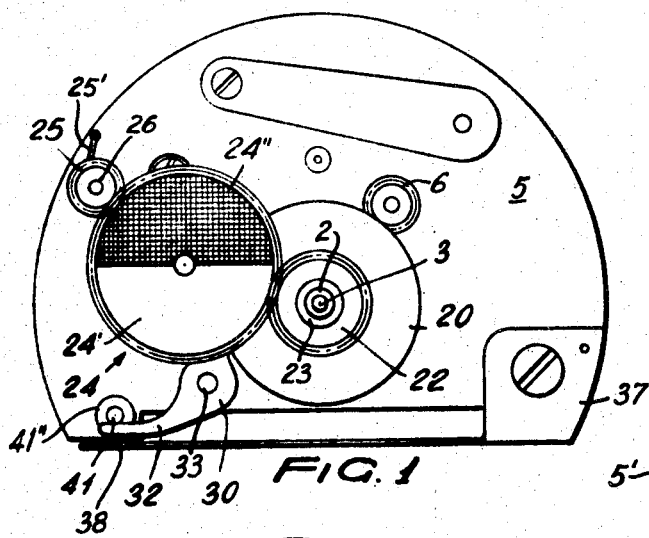
FIGURE 1 represents a front view of the device according to a first embodiment applied to an alarm clock.

To facilitate understanding of the nature and mode of operation of the control device of the present invention, specific reference will be made to its use with a conventional electric alarm clock. Further, for purposes of clarity, the clock casing and works are not illustrated in detail in the drawings; it being considered sufficient to show only the clock mounting plates 5, 5', a gear 6 which is employed to drivingly connect the electric motor of the clock, not shown, to the speed reducing mechanism of the device to be described, and electrical alarm circuit 5″ shown diagrammatically in FIGURE 10 as including a suitable alarm signal producing mechanism 5‴.

Figure 2:
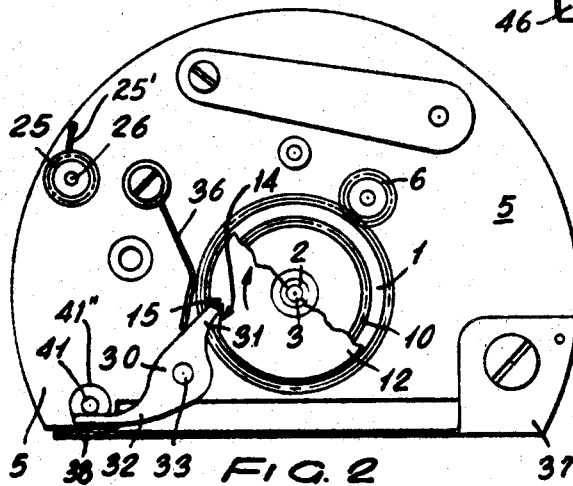
FIGURE 2 represents a similar view to FIGURE 1, but with some pieces removed.

Referring to FIGURE 2, it will be seen that the device according to the present invention includes a peripherally toothed gear 1 which is meshed with gear 6. Gear 1 is provided with an integrally formed hub portion 2 and a forwardly facing frontal circular gear rack 10. Hub 2 is adapted to carry the hour hand, not shown, of a conventional twelve hour clock and is shown as being rotatably supported by clock plates 5, 5'.

Figure 5:
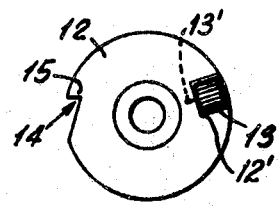
FIGURE 5 is a view illustrating the cam employed in the practice of the present invention.

A cam 12, shown particularly in FIGURES 2 and 5, is freely mounted for rotation on hub 2 and is provided adjacent its peripheral surface with a notch 14, which defines a tooth 15. Cam 12 is further provided with a pinion gear 13, which is disposed within cutout 12' and supported on shaft 13' for rotation about an axis arranged radially of shaft 3, and which is meshed with circular rack 10 of gear 1.

Figure 3:
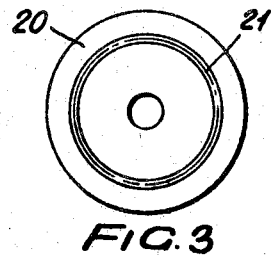
FIGURES 3 and 4 are rear and front views respectively, of the disc element shown in FIGURE 1.

A disc 20 is also freely mounted on the hub 2, and disposed adjacent cam 12 with its face, shown in FIGURE 3, turned towards the cam 12. This face has a frontal circular gear rack 21 which corresponds to rack 10 of gear 1 and is adapted to mesh with a diametrically opposite side of pinion 13.

Figure 4:
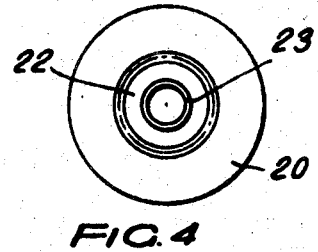

The disc 20 has on its other side (FIGURE 4), a peripherally toothed pinion 22 and a hub portion 23, which is adapted to carry a dial for the tappet of an alarm signal, not shown. It will be understood that, as in conventional clocks, the dial employed may be divided about its circumference into hours and fractions thereof, and may be viewed through a suitable clock casing window or opening, not shown, having a fixed index or reference mark.

A peripherally toothed gear 24 engages with the pinion 22 (FIGURE 1) and this gear has two equal portions on its external surface, one of which is white 24' and one 24" is cross-hatched.

One of the equal portions of toothed wheel 24 is visible through the window in the clock casing mentioned above.

Figure 6:
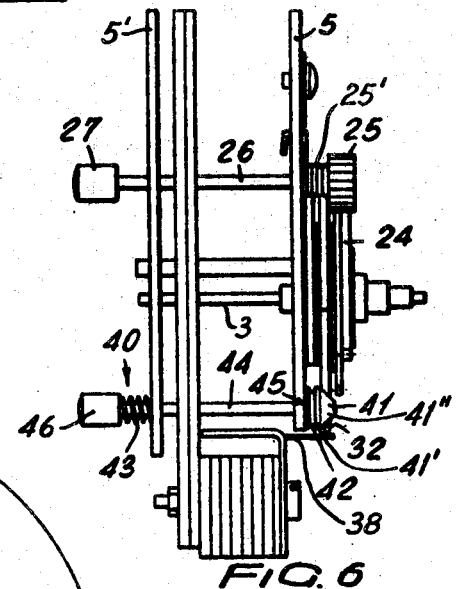
FIGURE 6 represents a side view of a part of the device shown in FIGURE 1.

The toothed wheel 24 is also engaged with a pinion 25, which is driven through a shaft 26 by a shagreen button 27 on the outside of the alarm clock (FIGURE 6).

The pinion 25 is frictionally constrained against rotation by means of a suitable spring 25' and thus gear 24 and the disc 20 remain stationary too. Consequently, when the gear 1 is rotated by gear 6, pinion 13 is forced by rack 10 of gear 1 to rotate and walk along rack 21 of disc 20 to thus affect rotation of cam 12.

In effect, gear 1 and disc 20 cooperate with pinion 13 to provide a speed reducing mechanism. By rotating pinion 25 by hand, disc 20 is driven by gear 24 through a desired rotation, and thus a supplemental rotation may be imparted the cam 12 to position the tappet dial and cam in the manner to be more fully hereinafter discussed.

The movement of the cam 12 is half as fast as that of the gear 1, whereby when gear 1 is turned through a full circle every 12 hours, cam turns a full circle every 24 hours.

The device has also a ratchet or lever member 30 with two arms 31 and 32, which turn round a shaft 33. It also has a spring 36, which tends to rotate ratchet 30 in a first or clockwise direction, as viewed in FIGURE 2, thereby tending to maintain the free end of arm 31 in contact with the peripheral surface of the cam 12. Arm 32 of the ratchet 30, in its turn, keeps its free end normally in contact with a spring blade 38, which has one end 37 fixed to the alarm clock plate 5. This blade 38 can constitute, for example, the movable contact of a circuit switch, into which is inserted an acoustic signal. Blade 38 tends to rotate its free end in a clockwise sense, as viewed in FIGURE 1, because of its elasticity, but the ratchet 30 opposes this with the arm 32, when arm 31 is disposed in engagement with the non-notched peripheral surface of cam 12.

The device also incorporates a blocking assembly 40 shown particularly in FIGURE 6 as including a stem 44, which is slidably mounted within apertures, not shown, provided in clock plates 5, 5'; a head portion 41; an operating button or knob 46; and a suitable spring 43, which is adapted to normally maintain the blocking assembly in an inoperative position or full left position, as viewed in FIGURE 6, with the rear surface 45 of head 41 in abutting engagement with clock plate 5. Head 41 is formed with a cylindrical portion 41' in the surface of which is disposed an annular groove 42, and a frustoconical end portion 41".

The device described above operates in the following manner:

By making the pinion 25 rotate through the button 27 and shaft 26, the gear 24 with which it is engaged is also rotated (FIGURES 1 and 6). Likewise pinion 22 engaged with gear 24, and the disc 20 integral with the pinion 22 rotates until the tappets disc of the alarm signal (disc fixed to the hub 23 integrally joined to disc 20) are brought in a position corresponding of the required hour.

It should be noted that since the gear ratio between pinion 22 and gear 24 is chosen as 2:1, every revolution of the disc 20 corresponds to a half a revolution of disc 24; therefore one revolution of disc 20 corresponds to the white half 24' (a.m.) of wheel 24 and another revolution corresponds to the cross-hatched half 24" (p.m.).

While the operation of setting the alarm tappets disc of the alarm into the required position, is being carried out, pinion 13 on the cam 12, being rotated by the circular rack 21 of the disc 20, and in turn engaging the rack 10 of gear 1, causes the rotation of cam 12 around the hub 2 until its notch 14 is brought into a position corresponding to that required by the tappets disc. Once the above operation has been carried out, the device is ready to operate the alarm at the prefixed time, every 24 hours.

In fact, the cam 12 undergoes a complete revolution every 24 hours, as stated above, so that every 24 hours notch 14 is presented adjacent ratchet 30, thereby permitting spring 36 to force the free end of ratchet arm 31 into notch 14. When this is done, ratchet 30 rotates in a clockwise sense, as viewed in FIGURE 2, permitting ratchet arm 32 to raise and allow the free end of blade 38 to rotate in a clockwise sense, also as viewed in FIGURE 2. This motion of blade 38 operates to close an electrical circuit including an alarm generating mechanism 5", shown in FIGURE 10.

The length of the alarm signal is determined by the shape of cam 12 due to the fact that upon continued rotation of cam 12 to remove notch 14 from adjacent ratchet 30, the peripheral surface of the cam forces arm 31 and thus ratchet 30 to rotate in an opposite direction or counterclockwise sense, as viewed in FIGURE 2 to return the ratchet to its original position. Upon return of ratchet 30 to its original position, ratchet arm 32 acts to force the free end of blades 38 to rotate in a counter clockwise direction, as viewed in FIGURE 2, to again open the electrical circuit and interrupt the alarm signal.

The alarm signal can also be cut off by means of an outside control by pressing button 46 of blocking assembly 40 of FIGURE 6. In fact, by pressing the button 46, the stem 44 is pushed to the right, as viewed in FIGURE 6, so as to force the frustoconical head portion 41" into engagement with arm 32 and cause the latter to move in a counterclockwise direction, as viewed in FIGURE 2, and ride onto head cylindrical portion 41', whereafter arm 32 is seated in groove 42 due to the action of spring 36.

When the above happens, the free end of arm 31 is partially removed from notch 14 and the free end of the blade 38 is rotated in counterclockwise sense, as viewed in FIGURE 2, and the alarm signal circuit is interrupted. However the counterclockwise rotation of the ratchet 30 which is caused by pushing button 46 is less than that caused by cam 12, when the latter is rotated to remove the notch from adjacent ratchet 30.

The result of this operation is that arm 32 of ratchet 30 disengages from the groove 42 on the head 41 of the blocking assembly 40, and the stem 44 itself, under the action of spring 43 returns to its rest or in operative position with head surface 45 in contact with the plate 5.

The device can then start up a new operation cycle and after 24 hours the cycle repeats itself automatically, even in the case of an external interruption of the alarm signal operated in the preceding cycle.

In the above description, the control device according to the invention was described as being part of an alarm clock. This was only to simplify the description, since this device can be used in other apparatus, in which the command produced thereby is utilisable for the periodic and cyclic operation of electrical and/or mechanical devices associated therewith.

A second improved embodiment of the device is shown in FIGURES 7 and 9. In these figures the ratchet 30 according to the preceding description is replaced by two levers 51 and 61, which are arranged side by side, but in different planes. The cam 12 has in the region of notch 14 a minimum radius R3 and a protruding area 12' of a radius R2, which is greater than the radius R1 of the cam itself. This area 12' is adjacent to the sloped portion 14' of notch 14, and suitably united to the periphery of the cam.

Lever 51, with its fulcrum on shaft 53, includes an arm portion 52 having a curved and pointed free end 52' adapted to slide along the peripheral surface of cam 12; and an arm portion 54 having a curved free end 54'.

Lever 61, with its fulcrum on shaft 63 includes arm portions 62 having a curved and pointed free end 62' adapted to slide along the peripheral surface of cam 12; and an arm portion 64 which terminates in an enlargement 64' having on it a pin 65 which engages with the end 54' of lever 51.

It will be understood that in the second embodiment of the present invention cam 12 is formed from insulating material and that curved free end 54' of lever 51 and pin 65, carried on lever 61, form the movable contacts of a suitable switch arranged in an electrical alarm circuit, which may be similar to that illustrated in FIGURE 10. In such case, levers 51 and 61 serve to replace blade 38.

The arms 52 and 62 belonging to levers 51 and 61 respectively differ in such a way that their respective free ends 52' and 62' are in contact with cam 12 at different peripherally spaced points, the distance between said points varying very slightly (some grades or fractions of grades) in relation to the centre of the cam.

The location of levers 51 and 61 is such that only lever 51 can be engaged by the head 41 upon setting of blocking assembly 40 (FIG. 9).

The operation of this second embodiment of the device is as follows:

When, because of the continuous rotation in the clockwise sense of cam 12, as viewed in FIGURE 7, the pointed end 52' of arm 52 of the lever 51 enters the notch 14, so that this end is at a minimum distance R3 from the centre of cam 12, the rotation of lever 51 round the shaft 53 brings the end 54' of arm 54 in contact with pinion 65. Closing of the contacts, as described, produces the command.

Upon continued rotation of cam 12, pointed end 62' of lever 61 enters the notch 14, after a length of time determined (as above-mentioned) by the distance between the points 52' and 62' on the cam. This causes the rotation of lever 61 around the shaft 63 and consequently the removal of pinion 65, carried by arm 64, from the end 54' of arm 54 of lever 51, so that the circuit opens and the command is interrupted.

The manual interruption of a command may be effected by blocking assembly 40, which operates in the same way as in the first embodiment, but only on lever 52. The command may be interrupted by pushing button 46, whereby head 41 will cause lever 52 to rotate in such a manner that pointed end 52' will be moved from notch 14 and disposed at a distance between R1 and R2 from the centre of the cam. This displacement of the end 54' of arm 54 away from the pin 65, causes the opening of the circuit and the interruption of the command.

When the area 12' of the cam 12, which has a radius R2, engages end 52', lever 51 is forced to disengage itself from blocking assembly 40 to permit the latter to return to its rest or inoperative position.

When it is desired to break the automatic sequence of the commands, during a cycle, button 46, connected with blocking assembly 40, is pushed inwards, blocking the arm 52 of lever 51 and restraining the pointed end 52' from entering notch 14. A command does not then take place for that cycle. Thereafter, area 13' of cam 12 functions to free lever 51 from blocking assembly 40 in the manner described above to permit a command to be produced during a succeeding cycle of cam rotation.

In the above description pin 65 is disclosed as being a contact of a switch, which can close a circuit whose closure happens when end 54' of lever 51 is in contact with it.

It is obvious, however, that the movement of pointed end 54' of lever 51 which produces the command, may be adapted to move a mechanical means in a device which differs from that described above; in this case said means will give the final command.

It is equally evident that any suitable means, such as spring 51' and 61' may be employed to normally maintain the points 52' and 62' of levers 51 and 61 respectively against cam 12.

What is claimed is:

1. A control device adapted to produce a command of a predetermined duration which is repeatable at pre-established intervals, said command having utility in controlling operation of another device which may be associated with said control device, which comprises a speed reduction unit including a rotatably supported cam adapted to be driven at a reduced speed, said cam having a notch disposed on the peripheral surface thereof; means normally engageable with said peripheral surface and movable into said notch when presented adjacent thereto upon rotation of said cam, movement of said means with respect to said cam due to the presence of said notch producing said command and said notch determining the duration of said command; and a blocking assembly, said assembly being settable to engage said means so as to interrupt command, said cam being operable to disengage said assembly from said means upon rotation of said cam to remove said notch from adjacent said means, and permit said command to be produced during a subsequent rotational cycle of said cam.

2. The device according to claim 1, wherein said means is a rotatably supported member, said member being normally biased to rotate in a first direction into said notch when presented adjacent thereto, said assembly when set is adapted to engage said member so as to force said member to rotate in an opposite direction, and said cam when rotated to remove said notch from adjacent said member being adapted to rotate said member in said opposite direction through a distance at least equal to that due to said assembly whereby said assembly is disengaged from said member.

3. The device according to claim 1, wherein said speed reduction unit additionally includes a rotatably supported driven gear and a normally stationary gear, said gears and cam being coaxially mounted on a shaft with said gears facing opposing said surfaces of said cam, said cam carrying a rotatably supported pinion, and said gears having facing circular gear racks adapted to mesh with said pinion.

4. The device according to claim 1, wherein said device is associated with a clock mechanism having a signal producing mechanism, and said command is employed to control operation of said signal producing mechanism.

5. The device according to claim 4, wherein said signal producing mechanism includes an electrical alarm circuit and a spring blade operable to control opening and closing of said alarm circuit, and said command producing movement of said means is adapted to control operation of said spring blade.

6. The device according to claim 5, wherein said means is a rotatably supported member engageable with said blade, said blocking assembly includes a movably mounted stem having a head mounted thereon and a resilient means tending to maintain said stem and head in an inoperable position, said head having a cylindrical portion disposed adjacent said stem and a frustoconical portion, said cylindrical portion having an annularly extending groove, said groove being adapted to receive said rotatably supported member when said stem and head are moved to set said assembly, and said cam being adapted to remove said rotatably supported member from said groove to permit said resilient means to return said stem and head to said inoperable position.

7. The device according to claim 5, wherein said means is a rotatably supported member engageable with said blade, said member being normally biased to rotate in a first direction into said notch when presented thereto, said assembly when set is adapted to engage said member so as to force said member in an opposite direction, and said cam when rotated to remove said notch from adjacent said member being adapted to rotate said member in said opposite direction through a distance at least equal to that due to said assembly to permit disengagement of said assembly from said member, whereby upon movement of said member in said first direction said blade operates to close said circuit and upon movement of said member in said opposite direction said blade operates to open said circuit.

8. The device according to claim 5, wherein said speed reduction unit additionally includes a rotatably supported driven gear and a normally stationary gear, said gears being coaxially mounted on a shaft with said gears facing opposing side surfaces of said cam, said cam carrying a rotatably supported pinion, said gears having facing circular gear racks adapted to mesh with said pinion, and means adapted to selectively rotate said normally stationary gear to effect selective rotation and adjustment of said cam with respect to said driven gear.

9. The device according to claim 1, wherein said device is associated with a clock mechanism having a signal producing mechanism, said command is employed to control operation of said signal producing mechanism, and said cam is rotated so as to permit said command to be produced once during a twenty four hour period, and second means are provided to selectively vary the time within said period for which said command is to be produced, said second means including indicia carrying means adapted to visually indicate the twelve hour a.m. and twelve hour p.m. portions of said period during which said command is to be produced as determined by said second means.

10. The device according to claim 1, wherein said means includes a pair of rotatably supported levers, said levers being disposed in spaced parallel planes, each of said levers having a first end portion normally engageable with said peripheral surface of said cam, said levers having second portions forming cooperating electrical switch contact surfaces the closing of which produces said command, said levers being adapted to be relatively rotated due to the presence of said notch to normally permit closing and opening of said contacts during each rotational cycle of said cam, and said blocking assembly when set being adapted to engage one of said levers to effect opening of said contacts to interrupt producing of said command.

11. The device according to claim 10, wherein said cam is provided on its peripheral surface adjacent said notch with a radially enlarged portion, said assembly when set is adapted to prevent movement of said one lever into said notch to prevent closing of said contacts and producing of said command during a rotational cycle of said cam, and said radially enlarged portion is adapted to disengage said one lever from said assembly to permit producing of a command during a subsequent rotational cycle of said cam.

12. The device according to claim 10, wherein said first end portions of said levers are adapted to engage said cam at the peripherally spaced points and are successively movable into said notch to effect closing and opening of said contacts.

13. The device according to claim 1, wherein said cam is provided on its peripheral surface adjacent said notch with a radially enlarged portion, said assembly when set is additionally adapted to prevent producing of said command during a rotational cycle of said cam, and said radially enlarged portion is adapted to disengage said assembly from said means to permit a command to be produced during a subsequent rotational cycle of said cam.

References Cited
UNITED STATES PATENTS

| | | | |
|---|---|---|---|
| 2,523,676 | 9/1950 | Brazee | 58—21.15 |
| 2,646,659 | 7/1953 | Bower | 58—21.15 |
| 2,652,682 | 9/1953 | Wolbarst | 58—21.15 |
| 2,939,337 | 6/1960 | Sweger | 200—153.13 |
| 3,131,267 | 4/1964 | Schneiter | 58—20 |
| 3,192,699 | 7/1965 | Stout | 58—21.15 |

RICHARD B. WILKINSON, *Primary Examiner.*

STANLEY A. WAL, *Assistant Examiner.*